Patented Oct. 29, 1929

1,733,695

UNITED STATES PATENT OFFICE

CURT RÄTH, OF BERLIN, GERMANY

PROCESS FOR THE PREPARATION OF ALPHA-HYDRAZINO-BETA-NITRO-PYRIDINE

No Drawing. Application filed February 1, 1926, Serial No. 85,378, and in Germany February 5, 1925.

The object of this invention is the preparation of 2-hydrazino-5-nitro-pyridine.

I have found that high yields of 2-hydrazino-5-nitropyridine are obtained, when reacting free hydrazine or hydrazine hydrate with 2-halogen-5-nitropyridine at ordinary temperatures.

Since a reaction between 2-halogenopyridine and hydrazine hydrate can only be effected with difficulty and heating, for example, to the boiling temperature, is essential, it was surprising to find, that with the starting materials of this invention the conversion into 2-hydrazino-5-nitropyridine proceeds with unexpected energy, so much so that it is best to effect the reaction under precautions, such precautionary measures being for instance the gradual addition of one reagent, cooling during the addition or diluting one or other or both of the reagents before bringing them into contact.

The ease with which the method is carried into effect is, furthermore, surprising because 2-chloro-5-nitro-pyridine is not susceptible to other exchange reactions, which generally take place with great ease. For example 2-chloro-5-nitropyridine is refractory towards alkali-metal cyanide or silver cyanide. Furthermore on heating with, for instance, metallic sodium up to 250° C. it is not possible to eliminate the halogen.

The following two examples serve to illustrate the method for producing 2-hydrazino-5-nitropyridine in accordance with my invention.

*Example 1.*—10 g. of powdered 2-chloro-5-nitropyridine are gradually entered with stirring and cooling into 36 g. of hydrazine hydrate.

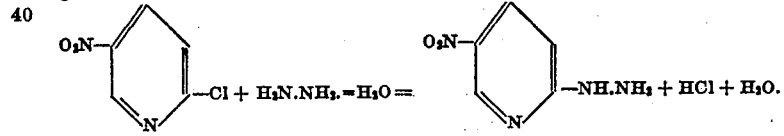

The 2-hydrazino-5-nitropyridine thus formed is precipitated at once and filtered off. It melts with decomposition at 203–204° C. It is difficultly soluble in organic solvents, but easily soluble in alkalies.

*Example 2.*—13 g. of an aqueous solution containing 50% of hydrazine hydrate are poured over 10 g. of finely divided 2-chloro-5-nitropyridine. The paste thus formed is allowed to stand for about 12 hours, agitating it repeatedly. The green 2-hydrazino-5-nitropyridine is filtered off and washed with water.

I claim:

1. A method for making 2-hydrazino-5-nitro-pyridine which consists in causing 2-halogen-5-nitro-pyridine to react with hydrazine in the cold.

2. A method for making 2-hydrazino-5-nitro-pyridine which consists in causing 2-halogen-5-nitro-pyridine to react with hydrazine in the presence of solvents and in the cold.

3. A method for making 2-hydrazino-5-nitropyridine which consists in causing 2-halogen-5-nitropyridine to react with an aqueous solution of hydrazine in the cold.

4. A method for making 2-hydrazino-5-nitro-pyridine which consists in causing 2-chlor-5-nitro-pyridine to react with hydrazine in the cold.

5. A method for making 2-hydrazino-5-nitro-pyridine which consists in causing 2-chlor-5-nitropyridine to react with an aqueous solution of hydrazine in the cold.

6. A new product consisting of 2-hydrazine-5-nitropyridine.

In testimony whereof I affix my signature.

DR. CURT RÄTH.